United States Patent
Kang

(10) Patent No.: US 12,340,526 B2
(45) Date of Patent: Jun. 24, 2025

(54) DATA PROCESSING METHOD AND DATA PROCESSING APPARATUS USING THE SAME

(71) Applicant: MEDIT CORP., Seoul (KR)

(72) Inventor: Dong Hwa Kang, Seoul (KR)

(73) Assignee: MEDIT CORP., Seoul (KR)

(*) Notice: Subject to any disclaimer, the term of this patent is extended or adjusted under 35 U.S.C. 154(b) by 539 days.

(21) Appl. No.: 17/699,150

(22) Filed: Mar. 20, 2022

(65) Prior Publication Data

US 2022/0309688 A1    Sep. 29, 2022

(30) Foreign Application Priority Data

Mar. 26, 2021 (KR) .......... 10-2021-0039663
Jul. 30, 2021  (KR) .......... 10-2021-0100509

(51) Int. Cl.
| | |
|---|---|
| G06T 7/33 | (2017.01) |
| A61C 9/00 | (2006.01) |
| A61C 13/34 | (2006.01) |
| G06T 17/00 | (2006.01) |

(52) U.S. Cl.
CPC .............. *G06T 7/33* (2017.01); *A61C 9/0053* (2013.01); *A61C 13/34* (2013.01); *G06T 17/00* (2013.01); *G06T 2200/24* (2013.01); *G06T 2207/30036* (2013.01)

(58) Field of Classification Search
USPC ......... 128/922–925; 382/123–133, 151–156; 706/1–62, 900–903
See application file for complete search history.

(56) References Cited

U.S. PATENT DOCUMENTS

| | | | |
|---|---|---|---|
| 10,404,817 B2* | 9/2019 | Frank | H04L 67/535 |
| 2001/0038705 A1 | 11/2001 | Rudger et al. | |
| 2015/0206306 A1* | 7/2015 | Adamson | A61C 9/0053 |
| | | | 433/215 |
| 2016/0153773 A1 | 6/2016 | Bartmann et al. | |
| 2017/0372527 A1 | 12/2017 | Murali et al. | |
| 2020/0089236 A1 | 3/2020 | Doemling et al. | |

FOREIGN PATENT DOCUMENTS

| | | |
|---|---|---|
| CN | 108458670 A | 8/2018 |
| DE | 10 2012 214 467 A1 | 2/2014 |
| KR | 101915024 B1 | 11/2018 |
| KR | 10-2020-0115580 A | 10/2020 |
| WO | 2020171589 A1 | 8/2020 |

(Continued)

OTHER PUBLICATIONS

Adamson Anders; Method For Carrying Out An Optical Three-dimensional Recording; 2015 (Year: 2015).*

(Continued)

*Primary Examiner* — Marcellus J Augustin
(74) *Attorney, Agent, or Firm* — Insight Law Group, PLLC; Seung Lee

(57) ABSTRACT

A data processing method includes obtaining a scan shot representing an object, aligning the scan shot with a preformed at least one inactive cluster, and selectively merging an active cluster including the scan shot and the inactive cluster based on whether the scan shot is aligned with the inactive cluster.

18 Claims, 11 Drawing Sheets

(56) References Cited

FOREIGN PATENT DOCUMENTS

WO   2021006701 A1   1/2021

OTHER PUBLICATIONS

Extended search report mailed Aug. 9, 2022 for European Application No. 22164417.2.
First office action issued on Mar. 7, 2024 for the Chinese Application No. 202210305008.3.
Non-final Office Action mailed Apr. 15, 2023 from the Korean Intellectual Property Office for Korean Application No. 10-2021-0100509.

* cited by examiner

|  |  | Is cluster alignment successful? | |
|---|---|---|---|
|  |  | Success | Failure |
| Is scan shot alignment successful? | Success | Merge active cluster and inactive cluster | Include scan shot in active cluster |
|  | Failure | Change active cluster and inactive cluster | Generate new active cluster |

DATA PROCESSING METHOD AND DATA PROCESSING APPARATUS USING THE SAME

The present application claims priority from Korean Patent Application Nos. 10-2021-0039663 filed on Mar. 26, 2021, and 10-2021-0100509 filed on Jul. 30, 2021, the disclosures of which are incorporated by reference herein in their entirety.

BACKGROUND

1. Technical Field

The present disclosure relates to a data processing method and a data processing apparatus using the same.

2. Related Art

Recently, a three-dimensional (3-D) scanner used to measure and analyze a narrow area, such as the inside of a mouth, is actively developed. The 3-D scanner is configured in a portable form so that a user (representatively a dentist) can easily scan the narrow area.

When using the 3-D scanner, the user consecutively scans the mouth of a patient and finally obtains one 3-D model representing an object (the inside of the mouth of the patient or a plaster cast modeled therefrom). The 3-D model modeled and generated in real time in the process of scanning, by the user who uses the 3-D scanner, may be formed as consecutively obtained image data is aligned with each other. For example, if three image data (first image data, second image data, and third image data) is consecutively obtained, a 3-D model may be generated as the second image data is aligned with the first image data and the third image data is aligned with the second image data.

In a conventional technology, however, if alignment between image data fails once, a 3-D modeling process is not performed after the alignment process fails. A user needs to be careful so that alignment can be performed normally by closely scanning an object again from a part where the alignment has failed. Although there is a difference according to a user's skill in scanning, dozens of times (e.g., 10 times) or more of alignment failures may occur in a process of a user scanning one arch. The user feels inconvenient in a process of scanning an object from a part where alignment has fails again. There is a problem in that a scan time is also increased.

Furthermore, in general, a user watches an object. Even though an alignment failure is fed back to a display screen, it is substantially impossible for the user to alternately confirm the object and the display screen. Furthermore, in a process of the user alternately confirming the object and the display screen, the user's concentration may be dispersed. A scan time taken to complete a 3-D model may be increased. There is a problem in that a development purpose of a 3-D scanner developed to rapidly obtain a 3-D model having a high level of completion is ignored.

PRIOR ART DOCUMENT

Patent Document (Patent Document 1) Korean Patent Application Publication No. 10-2020-0115580 (laid open on Oct. 7, 2020)

SUMMARY

Various embodiments are directed to providing a data processing method of finally generating one 3-D model by aligning, with a pre-formed inactive cluster, a scan shot obtained in a process of scanning an object and merging clusters through the alignment.

Furthermore, various embodiments are directed to providing a data processing apparatus for finally generating one 3-D model by the data processing method according to the present disclosure, which is performed by actions of organically connected components.

Objects of the present disclosure are not limited to the aforementioned object, and the other objects not described above may be evidently understood from the following description by those skilled in the art.

In an embodiment, a data processing method includes obtaining a scan shot representing an object, aligning the scan shot with a pre-formed at least one inactive cluster, and selectively merging an active cluster including the scan shot and the inactive cluster based on whether the scan shot is aligned with the inactive cluster.

Furthermore, the data processing method may further include aligning the scan shot with a previous scan shot included in the active cluster. The aligning of the scan shot with the inactive cluster and the aligning of the scan shot with the previous scan shot may be simultaneously or sequentially performed.

Furthermore, the aligning of the scan shot with the inactive cluster may include aligning feature points of the scan shot and feature points of the inactive cluster.

Furthermore, the selectively merging of the active cluster and the inactive cluster may include merging the inactive cluster with the active cluster and including, in the active cluster, scan shots included in the inactive cluster, when the scan shot is aligned with the previous scan shot and the scan shot is aligned with the inactive cluster.

Furthermore, when the scan shot is aligned with the previous scan shot and the scan shot is not aligned with the inactive cluster, the scan shot may be included in the active cluster.

Furthermore, when the scan shot is not aligned with the previous scan shot and the scan shot is not aligned with the inactive cluster, the active cluster may be deactivated, a new active cluster may be generated, and the scan shot may be included in the new active cluster.

Furthermore, when the scan shot is not aligned with the previous scan shot and the scan shot is aligned with the inactive cluster, the scan shot may be included in the inactive cluster.

Furthermore, when the scan shot is included in the inactive cluster, the inactive cluster may be activated, and the active cluster not including the scan shot may be deactivated.

Furthermore, the scan shot, the active cluster, and the inactive cluster may be displayed on a screen of a user interface having a plurality of areas including a main area occupying a given area and a sub-area occupying an area smaller than the main area. The scan shot and the active cluster may be displayed in the main area. When the scan shot is included in the inactive cluster, the inactive cluster may be activated and displayed in the main area, and the active cluster not including the scan shot may be deactivated and displayed in the sub-area.

In an embodiment, a data processing apparatus includes a scanner scanning an object, a controller configured to align a scan shot obtained by scanning the object with a pre-formed at least one inactive cluster and selectively merge an active cluster including the scan shot and the inactive cluster based on whether the scan shot is aligned with the inactive cluster, and a display unit displaying at least one of the scan shot, the inactive cluster, and the active cluster.

Furthermore, the controller may include a scan shot generation unit configured to generate the scan shot based on the object scanned by the scanner, an alignment unit configured to align the scan shot with a previous scan shot included in the active cluster or align the scan shot with the inactive cluster, and a cluster management unit configured to generate and manage the inactive cluster and the active cluster based on a result of the alignment of the alignment unit.

Furthermore, the alignment unit may simultaneously or sequentially perform a process of aligning the scan shot with the previous scan shot and a process of aligning the scan shot with the inactive cluster.

Furthermore, when the scan shot is aligned with the previous scan shot and the scan shot is aligned with the inactive cluster, the cluster management unit may merge the inactive cluster with the active cluster and may include, in the active cluster, scan shots included in the inactive cluster.

Furthermore, when the scan shot is aligned with the previous scan shot and the scan shot is not aligned with the inactive cluster, the cluster management unit may include the scan shot in the active cluster.

Furthermore, when the scan shot is not aligned with the previous scan shot and the scan shot is not aligned with the inactive cluster, the cluster management unit may deactivate the active cluster, may generate a new active cluster, and may include the scan shot in the new active cluster.

Furthermore, when the scan shot is not aligned with the previous scan shot and the scan shot is aligned with the inactive cluster, the cluster management unit may include the scan shot in the inactive cluster.

Furthermore, the cluster management unit may change, into the inactive cluster, an active cluster with which the scan shot has not been aligned, and may change, into the active cluster, an inactive cluster with which the scan shot has been aligned.

Furthermore, the display unit may display a user interface having a plurality of areas including a main area occupying a given area and a sub-area occupying an area smaller than the main area, may display the scan shot and the active cluster in the main area, and may activate and display the inactive cluster in the main area and deactivate and display the active cluster in the sub-area when the scan shot is included in the inactive cluster.

There are advantages in that resources used to generate a cluster can be reduced, an operation process can be simplified, and a scan speed can be maximized because a scan process is performed by minimizing the number of clusters generated using the data processing method and the data processing apparatus using the same according to the present disclosure.

Furthermore, there are advantages in that data can be classified in a cluster unit and a scan process can be continuously performed although an alignment failure between scan shots occurs, and the degree of freedom of a scan by a user is improved because the user can perform a scan regardless of whether alignment is successful or not.

DETAILED DESCRIPTION

Figure 1:
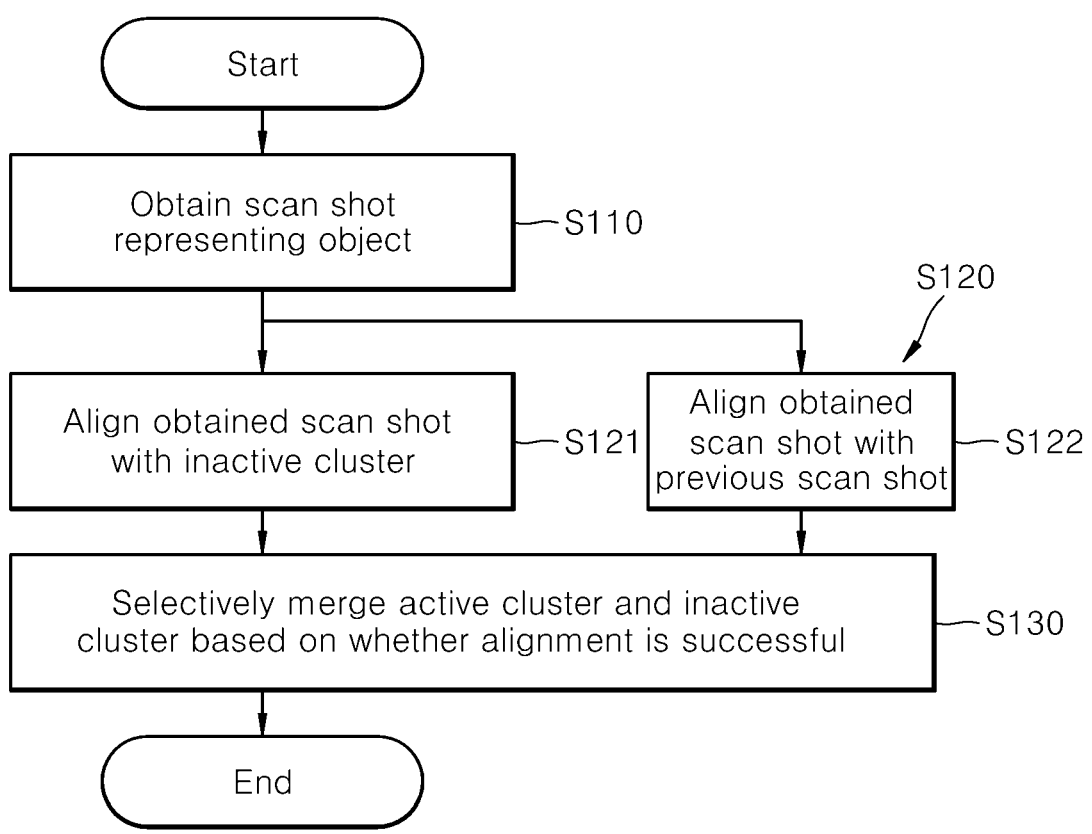
FIG. 1 is a flowchart of a data processing method according to the present disclosure.

Hereinafter, some embodiments of the present disclosure will be described in detail with reference to exemplary drawings. In adding reference numerals to the components of each drawing, it should be noted that the same components have the same reference numerals as much as possible even if they are displayed in different drawings. Furthermore, in describing embodiments of the present disclosure, when it is determined that a detailed description of the related well-known configuration or function hinders understanding of an embodiment of the present disclosure, the detailed description thereof will be omitted.

In describing components of an embodiment of the present disclosure, terms, such as a first, a second, A, B, (a), and (b), may be used. Such terms are used only to distinguish one component from the other component, and the essence, order, or sequence of a corresponding component is not limited by the terms. Furthermore, all terms used herein, including technical or scientific terms, have the same meanings as those commonly understood by a person having ordinary knowledge in the art to which the present disclosure pertains, unless defined otherwise in the specification. Terms, such as those commonly used and defined in dictionaries, should be construed as having the same meanings as those in the context of a related technology, and are not construed as being ideal or excessively formal unless explicitly defined otherwise in the specification.

FIG. 1 is a flowchart of a data processing method according to the present disclosure.

Referring to FIG. 1, the data processing method according to the present disclosure includes step S110 of obtaining a scan shot representing an object. Step S110 of obtaining the scan shot may mean that a scanner obtains image data representing the object by accommodating light reflected by a surface of the object. A camera embedded in the scanner accommodates light incident on the inside of the scanner and obtains the scan shot based on the accommodated light. In this case, the scan shot may be two-dimensional image data or may mean a 3-D stereoscopic data piece. The scan shots obtained by the scanner may be stored in an obtained order. A known storage device may be used as a configuration for storing the scan shots. The storage device may be a hard disk drive, a solid state drive (SSD), or a mobile type storage device (a USB flash drive, etc.), but the type of storage device is not limited to the examples disclosed in the present disclosure.

Figure 2:
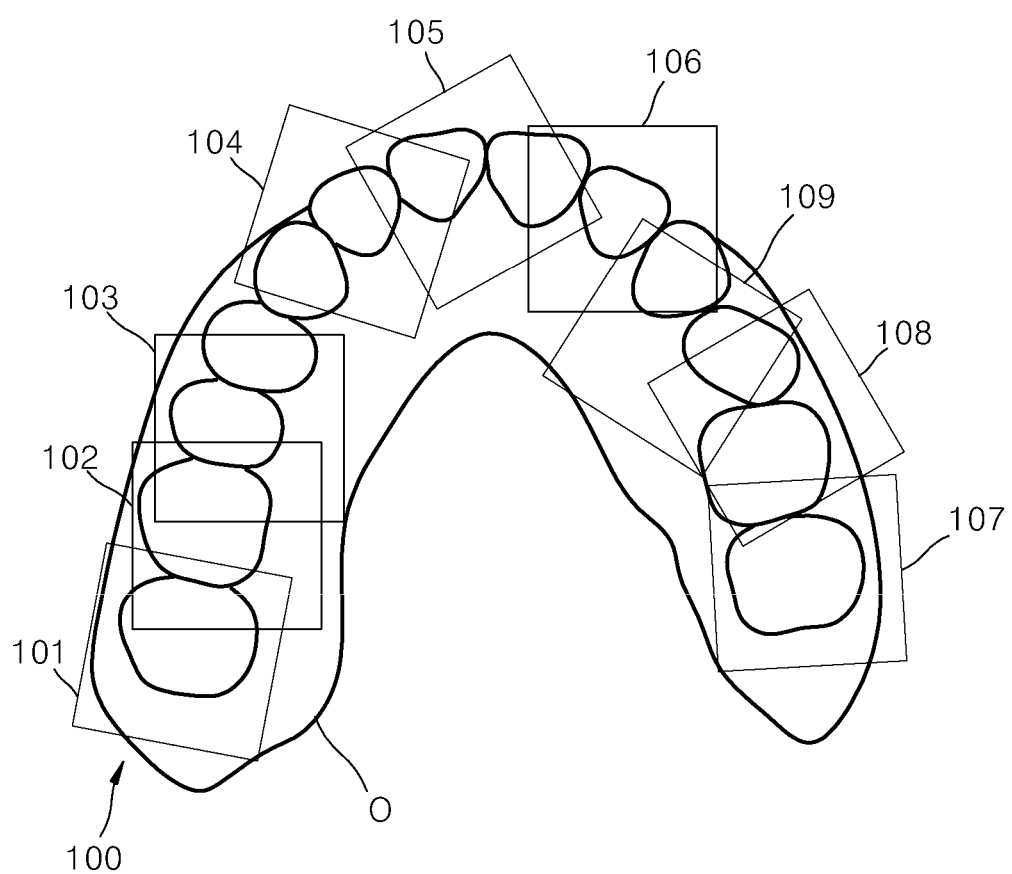
FIG. 2 is for describing a process of obtaining a scan shot representing an object.

FIG. 2 is for describing a process of obtaining a scan shot 100 representing an object O.

Referring to FIG. 2, the scan shot 100 may be obtained in plural based on a direction in which a scanner is moved and an angle at which the scanner is directed toward an object O. For example, as illustrated in FIG. 2, a first scan shot 101, a second scan shot 102, a third scan shot 103, a fourth scan shot 104, a fifth scan shot 105, a sixth scan shot 106, a seventh scan shot 107, an eighth scan shot 108, and a ninth scan shot 109 may be obtained by scanning the object O. In this case, a user does not need to sequentially scan the object O from one direction to the other direction, and may scan the object O in a way convenient for the user who performs a scan.

Referring to FIGS. 1 and 2, in the data processing method according to the present disclosure, an alignment process is performed to connect the obtained scan shots 100. In this case, the alignment performed between the scan shots 100 is denoted as "scan shot alignment." The scan shot alignment may mean that a scan shot obtained at specific timing is aligned with a scan shot (i.e., a previous scan shot) obtained at previous timing. A process of performing alignment between the scan shots 100 may be performed by using an iteration closest point (ICP) method, but the present disclosure is not essentially limited thereto.

When the alignment between the scan shots 100 is performed, if an overlap section between the scan shots 100 is not present or is insufficient (less than a reference value), a portion where scan shot alignment fails may occur. As illustrated in FIG. 2, the third scan shot 103 and the fourth scan shot 104 are not aligned with each other and the sixth scan shot 106 and the seventh scan shot 107 are not aligned with each other because an overlap section is not present between the third scan shot 103 and the fourth scan shot 104 and between the sixth scan shot 106 and the seventh scan shot 107. In such a case, the first to third scan shots 101, 102, and 103, the fourth to sixth scan shots 104, 105, and 106, and the seventh to ninth scan shots 107, 108, and 109 may be classified and stored as one group, another group, and still another group, respectively. In this case, a group in which the scan shots 100 are stored refers to a cluster 200. The cluster 200 may be a set of the scan shots 100 including at least one scan shot 100. That is, if the concept of the cluster 200 illustrated in FIG. 2 is applied, the first to third scan shots 101, 102, and 103, the fourth to sixth scan shots 104, 105, and 106, and the seventh to ninth scan shots 107, 108, and 109 may be classified and stored as a first cluster, a second cluster, and a third cluster, respectively. The cluster 200 may be newly generated depending on whether the scan shots 100 obtained by scanning the object are aligned with each other or different clusters 200 may be merged.

Hereinafter, an inactive cluster and an active cluster are described.

Figure 3:
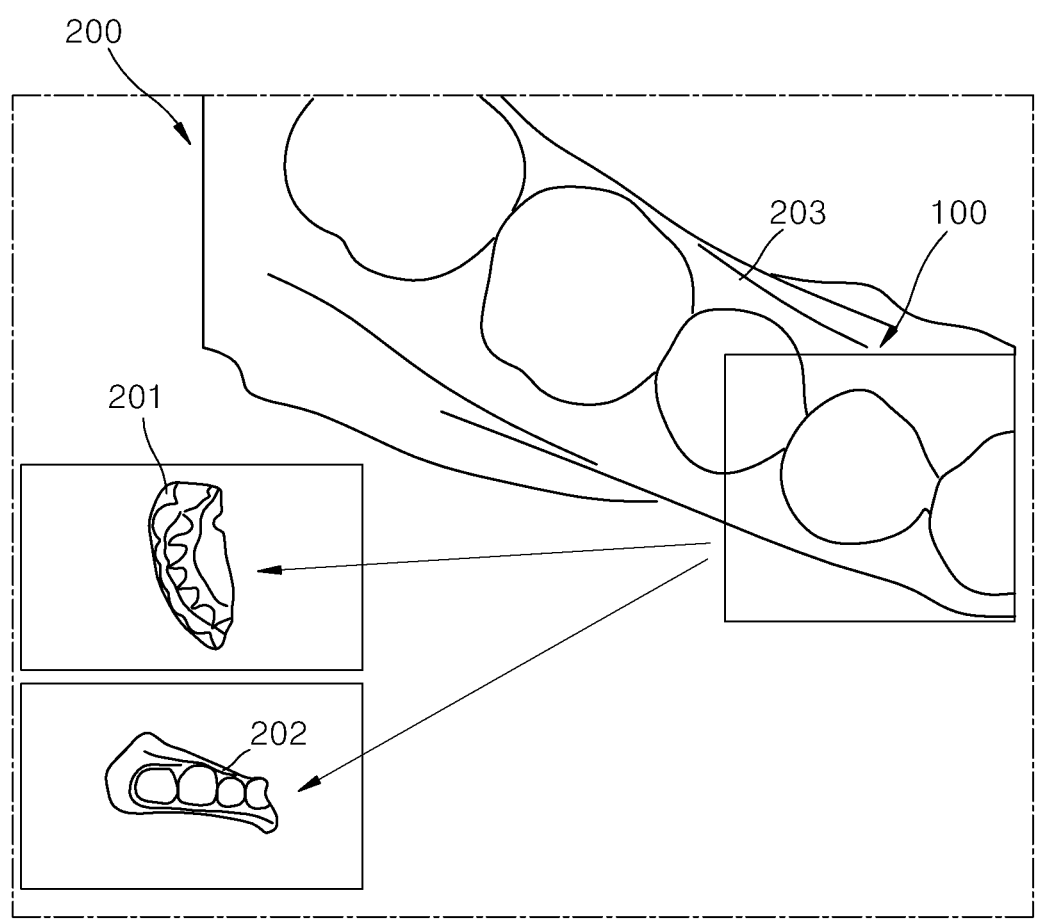
FIG. 3 is for describing an alignment process between a scan shot and a cluster.

FIG. 3 is for describing an alignment process between a scan shot and a cluster.

Referring to FIGS. 1 and 3, the obtained scan shots 100 may be stored in at least one cluster 200. In this case, in a scan process displayed in real time through a display unit, such as a monitor, a currently obtained scan shot 100 and a cluster 200 including the scan shot 100 may be primarily displayed, and previously obtained scan shots 100 and/or clusters 200 including the previously obtained scan shots may be incidentally displayed. As illustrated in FIG. 3, a currently obtained scan shot 100 and a third cluster 203 including the scan shot 100 are primarily displayed at a central part of a user interface screen 500 in real time, and a pre-formed first cluster 201 and second cluster 202 are additionally displayed on one side of a screen 500 of a user interface. In this case, a primarily displayed cluster 200 may be denoted as an active cluster, and an incidentally displayed cluster 200 may be denoted as an inactive cluster. The active cluster includes a previous scan shot. The previous scan shot acts as a target with which scan shot alignment is performed on a new scan shot 100 obtained in a scan process. For example, if the eighth scan shot included in the third cluster 203 is most recently obtained, the eighth scan shot may function as a previous scan shot, the third cluster 203 may function as an active cluster, and a user may obtain a new ninth scan shot in a scan process. The inactive cluster acts as a target with which cluster alignment is performed on a scan shot 100 obtained in the scan process.

Figure 4:
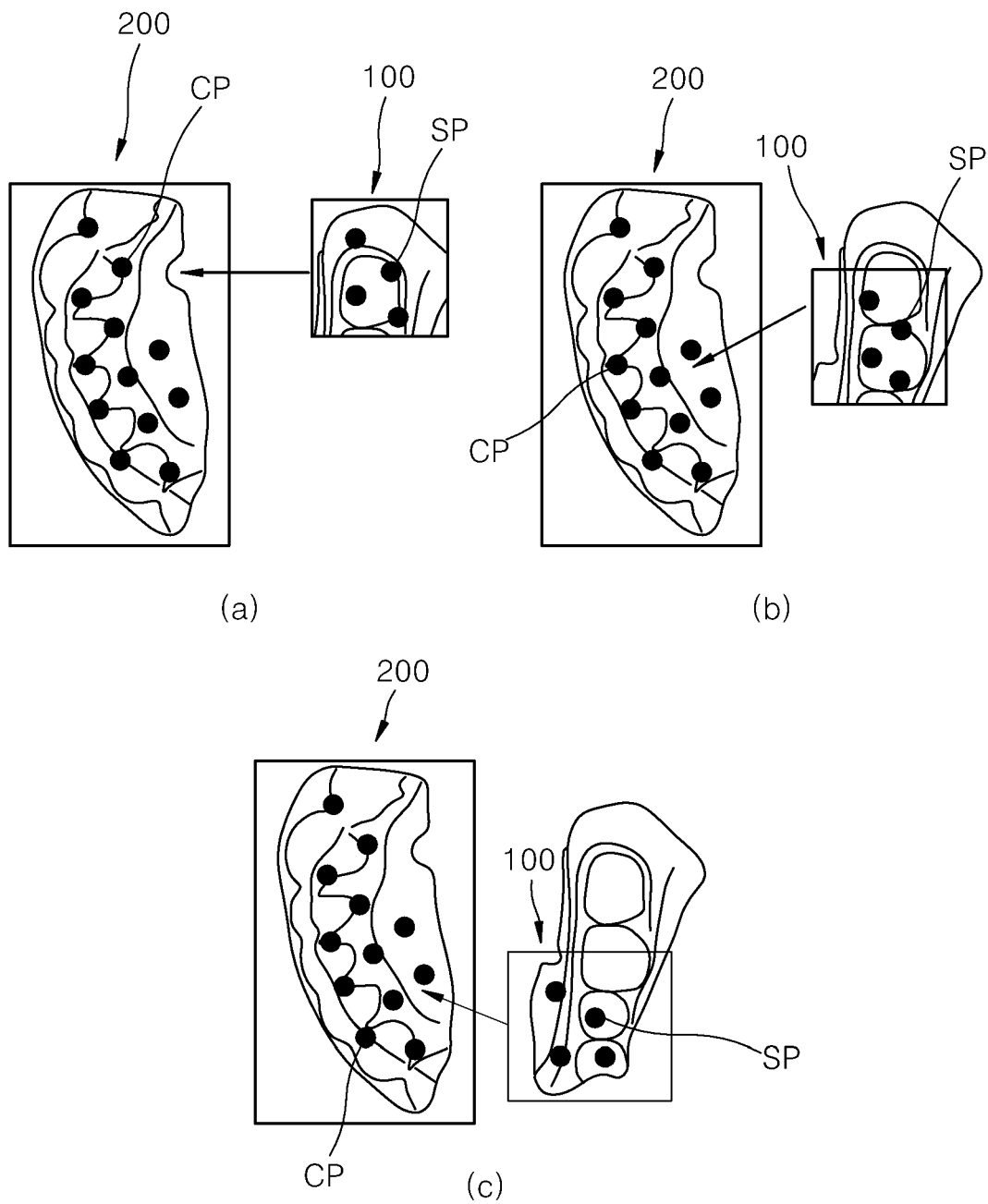
FIG. 4 is for describing feature points used as media by which a scan shot and a cluster are aligned with each other.

FIG. 4 is for describing feature points used as media by which a scan shot and a cluster are aligned with each other. More specifically, FIGS. 4(a), 4(b), and 4(c) are for describing a process of scan shot feature points SP of scan shots 100 obtained as a scan process is performed from FIG. 4(a) to FIG. 4(c) being compared with cluster feature points CP of a cluster 200.

Referring to FIGS. 1, 3, and 4, the data processing method according to the present disclosure includes step S121 of aligning the scan shot 100 with a pre-formed at least one inactive cluster. The step of aligning a scan shot 100 with a pre-formed inactive cluster is called cluster alignment.

When cluster alignment is performed, a medium called a feature point may be used to align an inactive cluster with a scan shot 100. Each of the scan shot 100 and the cluster 200 has at least one feature point. The feature point may have color information, curve information, shape information, etc. appearing at a specific location of each datum. The feature point may be obtained by sampling each datum (a cluster and a scan shot formed in a point cloud form).

For example, the cluster 200 may have a plurality of cluster feature points CP. The scan shot 100 may have a plurality of scan shot feature points SP. When an inactive cluster and the scan shot 100 are aligned with each other, alignment between the inactive cluster and the scan shot 100 may be performed by comparing information of a cluster feature point CP and information of a scan shot feature point SP. As described above, a method of performing alignment by using a feature point as a medium may be included in the category of initial alignment. Additionally, the initial alignment may be performed by using a method of aligning the center point of the scan shot 100 with a given point of the cluster 200, slightly differently from the aforementioned method.

A method for cluster alignment may be slightly different from a method for scan shot alignment. For example, in the cluster alignment, the initial alignment may be performed, the scan shot 100 and the cluster 200 may be aligned with each other by using, as media, the feature points SP and CP of the respective scan shot 100 and cluster 200, and precise alignment between the scan shot 100 and the cluster 200 may be performed by using the ICP method. In contrast, in the scan shot alignment, alignment between the scan shots 100 may be performed by using only the ICP method.

The clusters 200 formed on the left of FIGS. 4(a), 4(b), and 4(c) are inactive clusters. The scan shots 100 formed on the right of FIGS. 4(a), 4(b), and 4(c) are obtained as a scan process is performed. As the scan shot 100 is obtained, the scan shot feature points SP may also be obtained by sampling the scan shot 100. Cluster alignment is performed by comparing the scan shot feature points SP with the cluster feature points CP. In the process of performing the cluster alignment, cluster alignment is not subsequently performed again on the scan shot 100 that is obtained in a scan process and on which cluster alignment with a pre-formed inactive cluster has been attempted.

In a conventional technology, in order to attempt alignment between a cluster 200 and a cluster 200, a portion (overlap area) overlapped between the clusters 200 needs to be consecutively detected. More specifically, in the conventional technology, in order to compare one cluster with another cluster, characteristics of the entire one cluster are compared with characteristics of the entire another cluster. In such a process, as the number of scan shots accumulated in each cluster is increased, the size of the cluster is increased. There is a problem in that an operation load is excessively increased in performing a comparison process between the clusters. In contrast, in the disclosure, after alignment between a scan shot 100 and a cluster 200 is performed, cluster alignment with another cluster 200 is not performed on a scan shot 100 included in any one cluster 200. Accordingly, the time taken to finally obtain one 3-D model can be reduced, and a load necessary for an operation can also be reduced.

As illustrated in FIG. 4, it has been illustrated that the cluster 200 has twelve cluster feature points CP and the scan shot 100 has four scan shot feature points SP, but the present disclosure is not essentially limited to the numbers. Each of the cluster feature point CP and the scan shot feature point SP may be set as a proper number in order to implement a fast alignment speed and accurate alignment between data.

According to the aforementioned contents, the data processing method according to the present disclosure may include two types of alignment steps S120. One may be step S121 of aligning, with a pre-formed inactive cluster, a scan shot 100 obtained in a scan process. The other may be step S122 of aligning a scan shot 100 obtained in a scan process with a previous scan shot included in an active cluster. That is, step S121 may be a step of performing a cluster alignment process, and step S122 may be a step of performing a scan shot alignment process. Step S121 of aligning a scan shot with an inactive cluster and step S122 of aligning a scan shot with a previous scan shot may be simultaneously or sequentially performed. For example, as illustrated in FIG. 1, an obtained scan shot 100 may attempt cluster alignment with an inactive cluster while attempting scan shot alignment with a previous scan shot. Alternatively, an obtained scan shot 100 may preferentially attempt scan shot alignment with a previous scan shot, and may then attempt cluster alignment with inactive clusters. Inversely, the obtained scan shot 100 may preferentially attempt cluster alignment with inactive clusters and may then attempt scan shot alignment with a previous scan shot. That is, as illustrated in FIG. 1, step S121 and step S122 have been illustrated as being performed in parallel, but the present disclosure is not essentially limited thereto. Step S121 may be first performed and step S122 may be then performed, or step S122 may be first performed and step S121 may be then performed.

Hereinafter, step S130 of selectively merging an active cluster and an inactive cluster in the data processing method according to the present disclosure is described in detail.

Figures 5, 6:
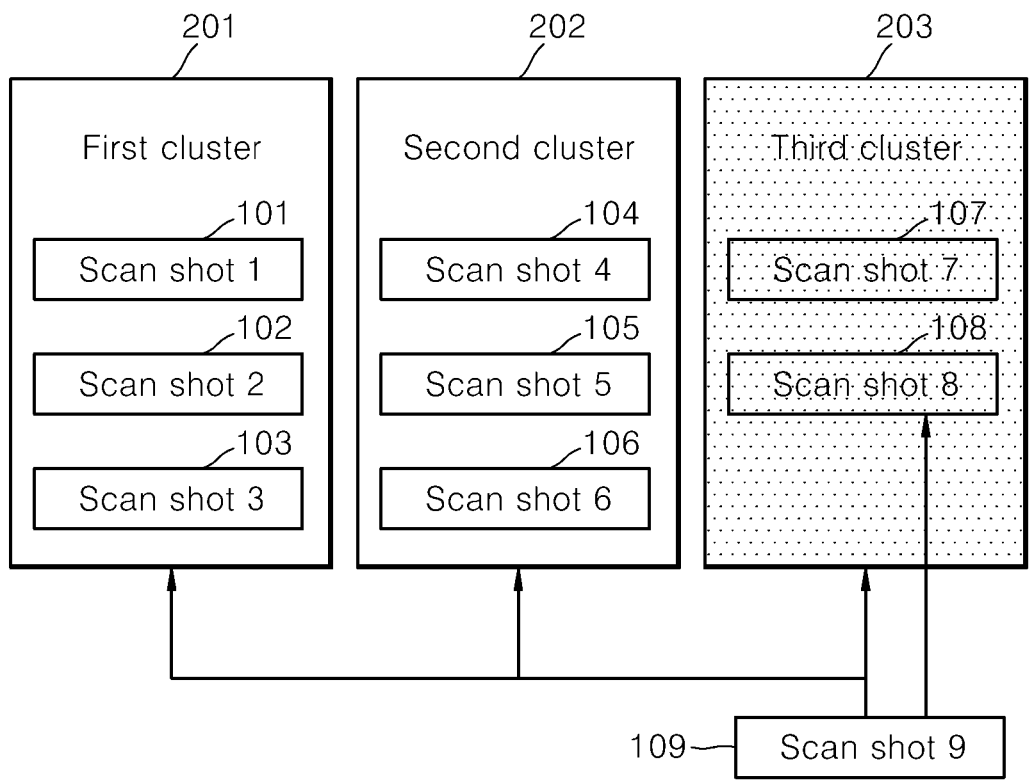
FIG. 5 is for describing a detailed process of S130.
FIGS. 6 to 10 are for describing a process of data being processed depending on whether scan shot alignment and cluster alignment are successful or not in a data processing method according to the present disclosure.

FIG. 5 is for describing a detailed process of S130. FIGS. 6 to 10 are for describing a process of data being processed depending on whether scan shot alignment and cluster alignment are successful or not in the data processing method according to the present disclosure. When the present disclosure is described with reference to FIGS. 6 to 10, a shaded cluster may mean an active cluster, and a cluster that is not shaded may mean an inactive cluster.

Referring to FIGS. 1 and 5, the data processing method according to the present disclosure includes step S130 of selectively merging an active cluster and an inactive cluster including a scan shot 100 based on whether a scan shot and an inactive cluster are aligned with each other in step S121. Accordingly, an active cluster and an inactive cluster may form one merged cluster. As a process of the clusters 200 being merged is repeated, a finally complete one 3-D model may be obtained. To selectively merge an active cluster and an inactive cluster may mean that an active cluster and an inactive cluster are merged in a specific condition depending on whether cluster alignment and scan shot alignment are successful or not.

Step S130 of selectively merging an active cluster and an inactive cluster is more specifically described. Step S130 may include at least two determination steps. In step S130, whether cluster alignment and scan shot alignment are successful may be determined. For example, in step S130, whether scan shot alignment is successful may be determined, and whether cluster alignment is successful may be then determined. However, the present disclosure is not essentially limited to the order. In step S130, after whether cluster alignment is successful is determined, whether scan shot alignment is successful may be determined. Furthermore, in step S130, whether scan shot alignment and cluster alignment are successful or not may be determined in parallel.

The determination steps are more specifically described through one example with reference to FIG. 6. For example, eight scan shots 100 have been first obtained, and the scan shots 100 are included in the three clusters 200. In this case, the first cluster 201 may include the first scan shot 101, the second scan shot 102, and the third scan shot 103. The second cluster 202 may include the fourth scan shot 104, the fifth scan shot 105, and the sixth scan shot 106. The third cluster 203 may include the seventh scan shot 107 and the eighth scan shot 108. A user may obtain the ninth scan shot 109 after the eighth scan shot 108 by scanning the object. In this case, a previous scan shot is the eighth scan shot 108. The third cluster 203 including the previous scan shot is an active cluster, and the first cluster 201 and the second cluster 202 not including the previous scan shot are inactive clusters The ninth scan shot 109 may attempt scan shot alignment with the eighth scan shot 108, that is, a previous scan shot, and may attempt cluster alignment with the first cluster 201 and the second cluster 202, that is, inactive clusters. In this case, a process of the scan shot alignment and the cluster alignment being performed has been described above.

Figure 7:
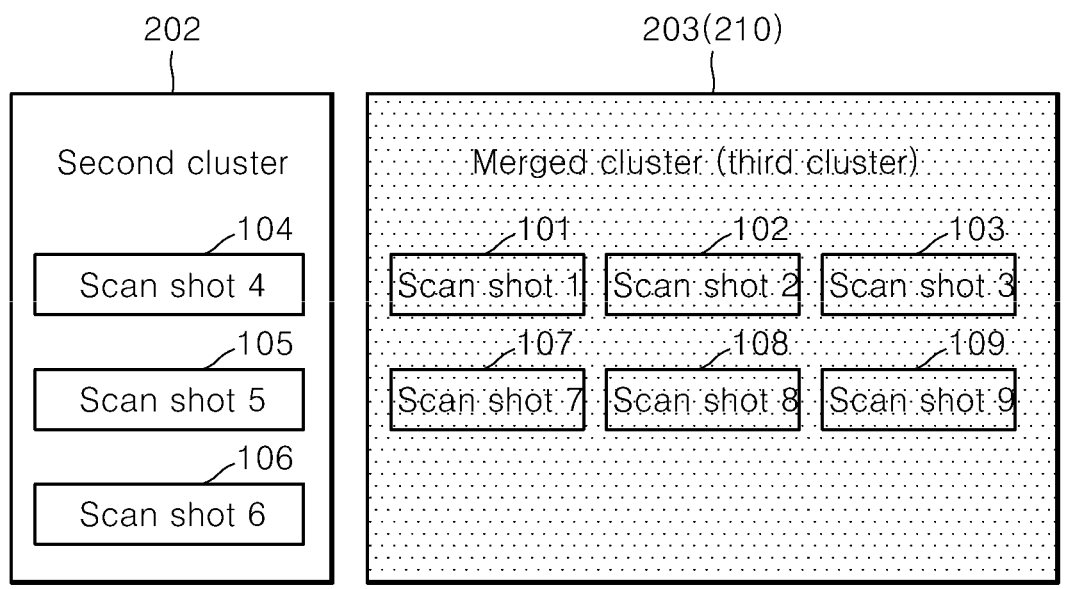

Referring to FIGS. 5 and 7, in step S130, if an obtained scan shot (the ninth scan shot) is aligned with a previous scan shot (the eighth scan shot) and the scan shot (the ninth scan shot) is aligned with an inactive cluster (any one of the first cluster and the second cluster), the inactive cluster subjected to cluster alignment with the scan shot may be merged with an active cluster. For example, it is assumed that the cluster alignment of the ninth scan shot 109 with the first cluster 201 has been successful. In this case, the first cluster 201, that is, an inactive cluster, may form a merged cluster 210 by being merged with the third cluster 203, that is, an active cluster. Furthermore, the merged cluster 210 may include all the scan shots 100 included in the first cluster 201 and the third cluster 203. That is, the scan shots 101, 102, and 103 included in the first cluster 201, that is, an inactive cluster, may be included in the third cluster 203, that is, an active cluster. The merged cluster 210 may include the first scan shot 101, the second scan shot 102, the third scan shot 103, the seventh scan shot 107, the eighth scan shot 108, and the ninth scan shot 109. The merged cluster 210 may function as an active cluster.

Figure 8:
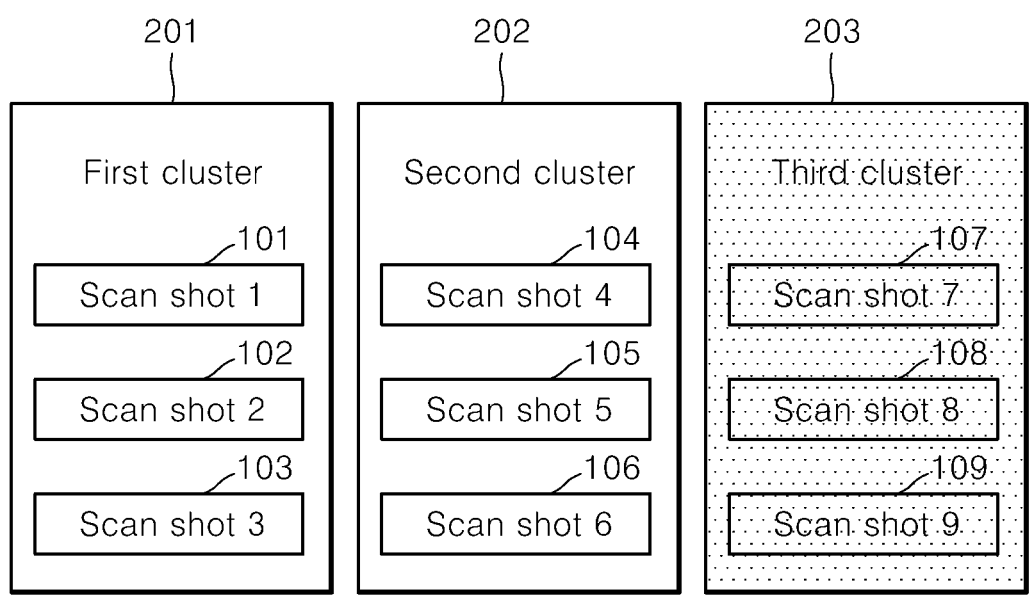

Furthermore, referring to FIGS. 5 and 8, if the ninth scan shot 109 is subjected to scan shot alignment with the eighth scan shot 108, that is, a previous scan shot, but is not subjected to cluster alignment with any of the first cluster 201 and the second cluster 202, that is, inactive clusters, the ninth scan shot 109 may be included in the third cluster 203, that is, an active cluster. Thereafter, when a scan process is performed and a subsequent tenth scan shot (not illustrated) is obtained, the ninth scan shot 109 may function as a previous scan shot, and the third cluster 203 including the ninth scan shot 109 may function as an active cluster. The tenth scan shot may attempt scan shot alignment with the ninth scan shot 109, and may attempt cluster alignment with the first cluster 201 and the second cluster 202.

Figure 9:
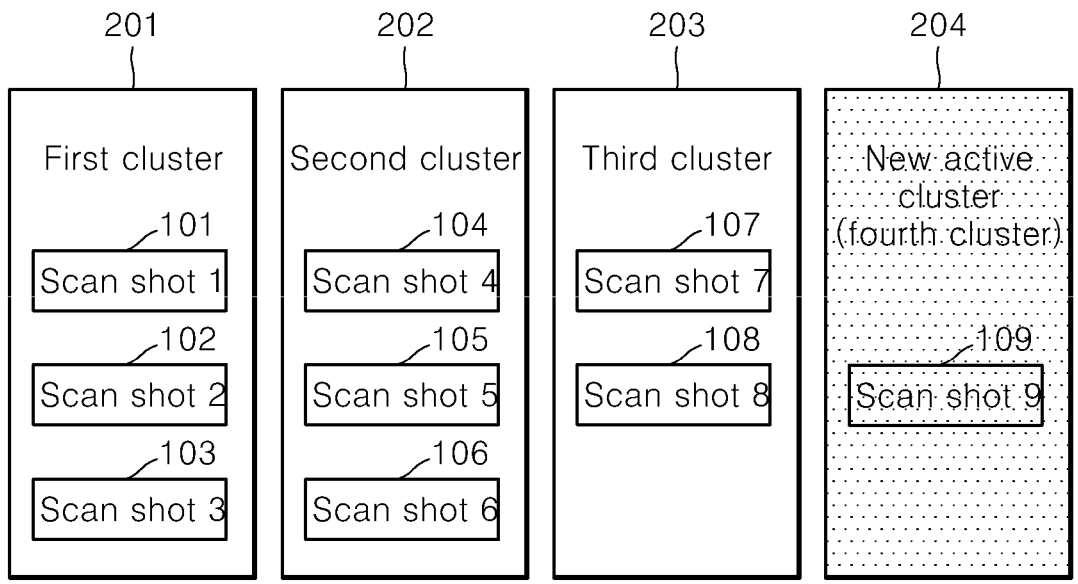

Furthermore, referring to FIGS. 5 and 9, if the ninth scan shot 109 is not subjected to scan shot alignment with the eighth scan shot 108, that is, a previous scan shot, and the ninth scan shot 109 is not subjected to cluster alignment with any of the first cluster 201 and the second cluster 202, that is, inactive clusters, it may be determined that the ninth scan shot 109 is not aligned with any of the pre-formed inactive and active clusters 201, 202, and 203. In such a case, the ninth scan shot 109 may be included in a new active cluster that is not included in the pre-formed inactive and active clusters 201, 202, and 203 and that is newly generated. For example, a fourth cluster 204, that is, a new active cluster, is generated, and the ninth scan shot 109 is included in the fourth cluster 204. Thereafter, when a scan process is performed and a subsequent tenth scan shot is obtained, the ninth scan shot 109 may function as a previous scan shot, and the fourth cluster 204, that is, a new active cluster including the ninth scan shot 109, may function as an active cluster. At this time, the third cluster 203 that was an active cluster may be changed into an inactive cluster. The tenth scan shot may attempt scan shot alignment with the ninth scan shot 109, and may attempt cluster alignment with the first cluster 201, the second cluster 202, and the third cluster 203.

Figure 10:
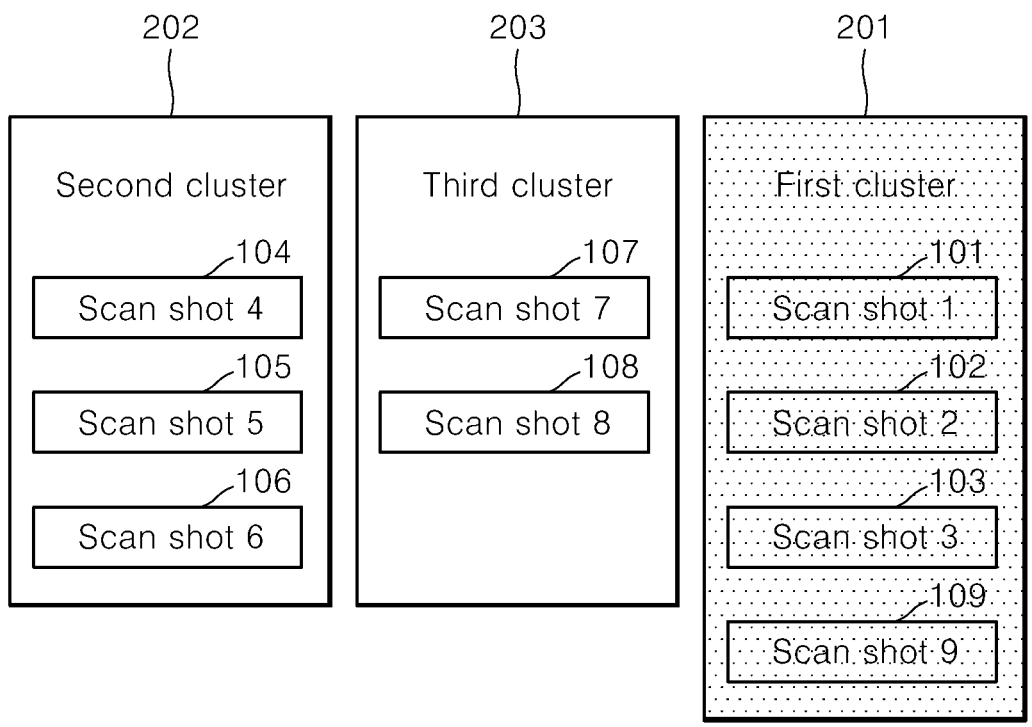

Furthermore, referring to FIGS. 5 and 10, if the ninth scan shot 109 is not subjected to scan shot alignment with the eighth scan shot 108, that is, a previous scan shot, and the ninth scan shot 109 is subjected to cluster alignment with any one of the first cluster 201 and the second cluster 202, that is, inactive clusters, the ninth scan shot 109 may be included in an inactive cluster with which cluster alignment has been performed. For example, when the ninth scan shot 109 is subjected to cluster alignment with the first cluster 201, that is, an inactive cluster, the ninth scan shot 109 is included in the first cluster 201. Furthermore, when a subsequent scan process is performed and a subsequent tenth scan shot is obtained, the ninth scan shot 109 may function as a previous scan shot, and the first cluster 201 including the ninth scan shot 109 may function as an active cluster. That is, when the ninth scan shot 109 is included in the first cluster 201, that is, an inactive cluster, an active cluster and an inactive cluster may be changed so that the first cluster 201, that is, an inactive cluster, is activated and the third cluster 203 that was an active cluster is deactivated. A user may easily check the cluster 200 including a currently obtained scan shot 100. Accordingly, there is an advantage in that the user can check a location of an object scanned by the user. Furthermore, there is an advantage in that a scan can be freely performed regardless of whether alignment is successful or not. Furthermore, although a scan shot alignment failure occurs, if cluster alignment is successful, an unnecessary new cluster is not generated and an inactive cluster is activated and used. Accordingly, there is an advantage in that an operation speed is improved because the number of clusters taken into consideration in an alignment process is minimized.

Figure 11:
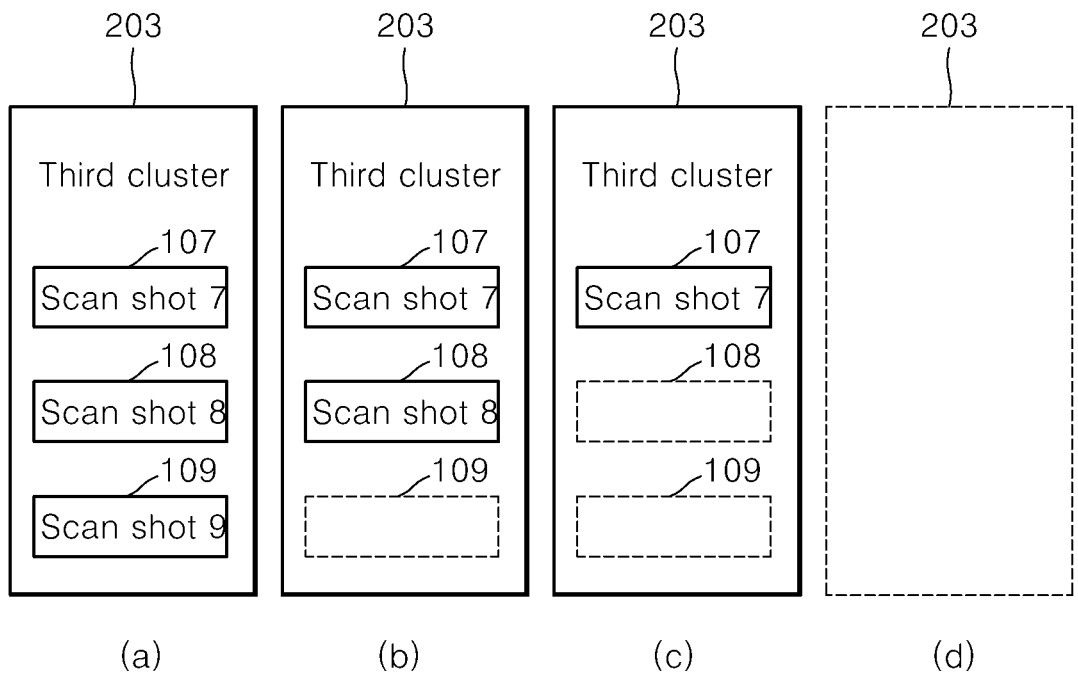
FIG. 11 is for describing an undo process in which a third cluster is taken as an example.

FIG. 11 is for describing an undo process in which the third cluster 203 is taken as an example.

Referring to FIG. 11, a user may cancel the acquisition of the scan shot 100. For example, referring to FIG. 11(a), it is assumed that the third cluster 203, that is, an active cluster, includes the seventh scan shot 107, the eighth scan shot 108, and the ninth scan shot 109. A user may select an undo button (not illustrated) formed on a user interface screen, and may delete a scan shot in reverse order of time from a scan shot 100 that has been most recently obtained. In FIG. 11(b), when a user selects the undo button, the ninth scan shot 109 that has been most recently obtained may be deleted. Referring to FIG. 11(c), when the user selects the undo button again, the eighth scan shot 108 obtained prior to the deleted ninth scan shot 109 may be deleted. Referring to FIG. 11(d), when the user selects the undo button again, the seventh scan shot 107 obtained prior to the deleted eighth scan shot 108 may be deleted. At this time, since the third cluster 203 does not include any scan shot 100, the third cluster 203 may also be deleted. When the third cluster 203 is deleted, a cluster functioning as an active cluster before the third cluster 203 functions as an active cluster may be activated again and displayed on a screen of a user interface. Thereafter, additionally, when an undo process is performed, scan shots may be deleted in reverse order of time obtained from a scan shot 100 that has been most recently obtained in the activated cluster.

A process of deleting the obtained scan shot 100 may be performed in one shot unit as described above, but a plurality of scan shots 100 may be together deleted, if necessary.

Hereinafter, a process of a user interface screen being changed when the scan shot 100 is aligned with an inactive cluster and the inactive cluster is changed into an active cluster is more specifically described.

Figure 12:
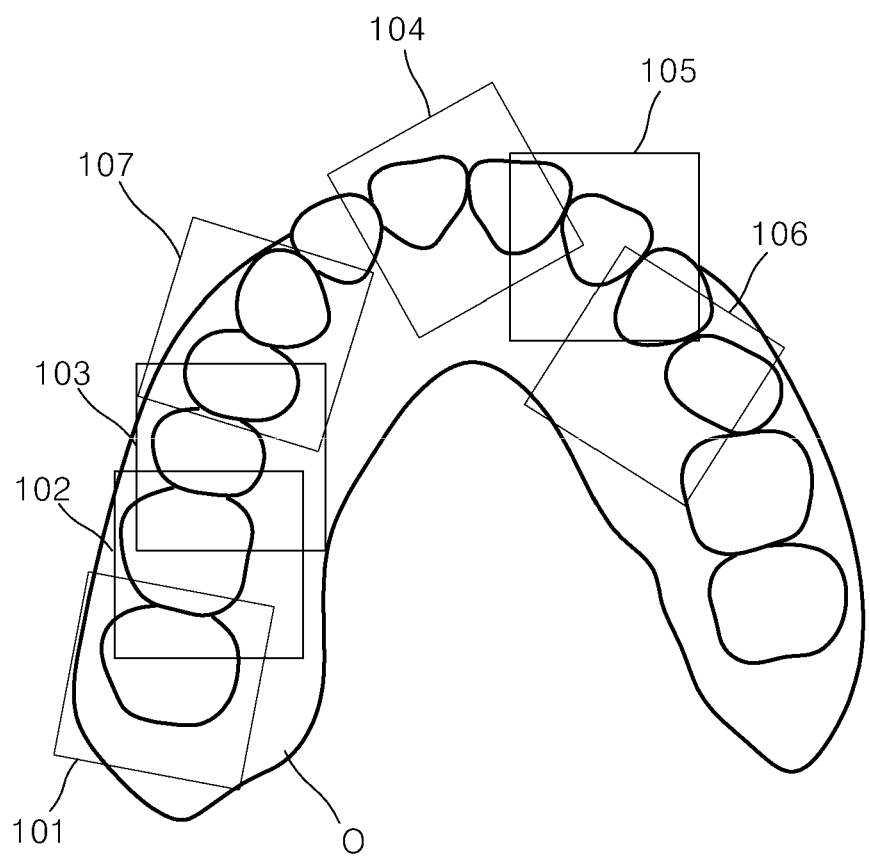
FIG. 12 is for describing a process of a screen being changed as a scan shot is aligned with an inactive cluster in a data processing method according to the present disclosure.
Figure 13:
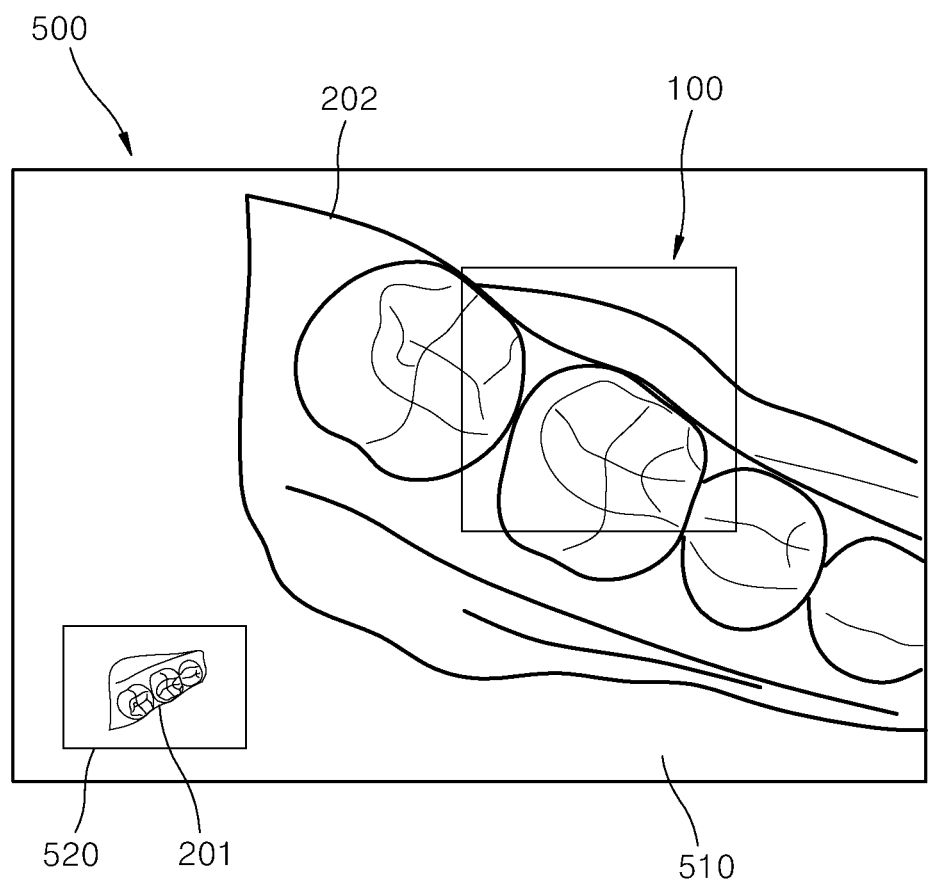
FIGS. 13 and 14 are for describing a screen change process between an active cluster and an inactive cluster.
Figure 14:
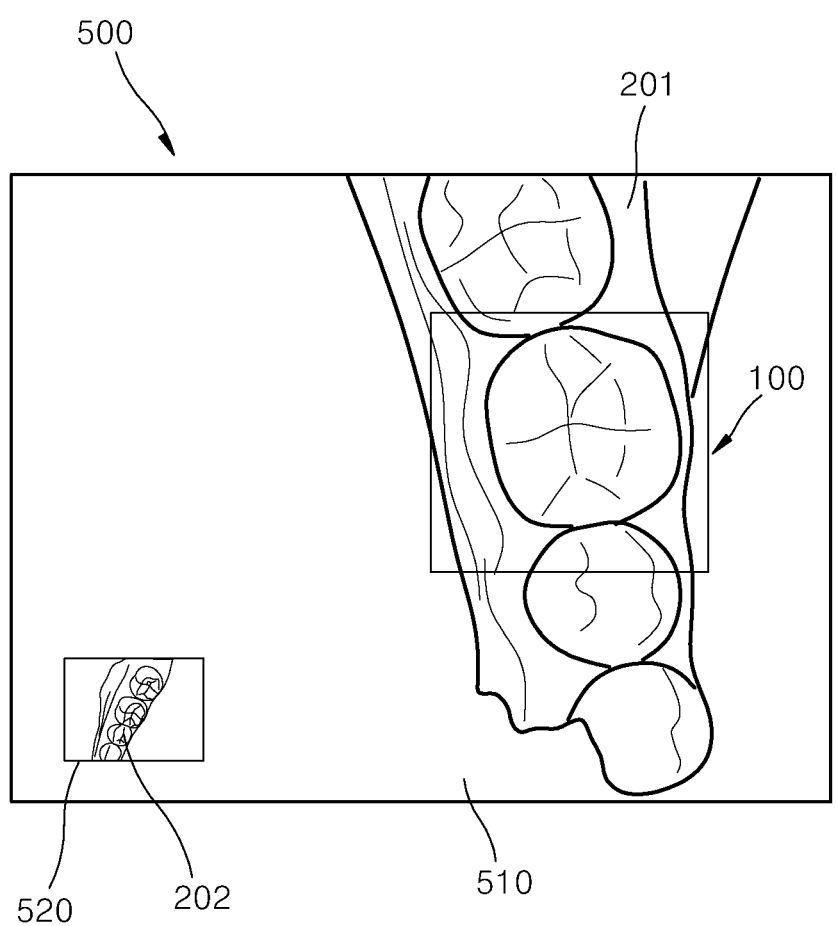

FIG. 12 is for describing a process of a screen being changed as the scan shot 100 is aligned with an inactive cluster in a data processing method according to the present disclosure. FIGS. 13 and 14 are for describing a screen change process between an active cluster and an inactive cluster.

Referring to FIGS. 12 and 13, a plurality of scan shots 100 representing an object O is obtained by scanning the object O. For example, a user may obtain a first scan shot 101, a second scan shot 102, a third scan shot 103, a fourth scan shot 104, a fifth scan shot 105, a sixth scan shot 106, and a seventh scan shot 107 by scanning the object O. Based on the illustration in FIG. 12, the first scan shot 101, the second scan shot 102, and the third scan shot 103 may be included in a first cluster 201, and the fourth scan shot 104, the fifth scan shot 105, and the sixth scan shot 106 may be included in a second cluster 202. Before the user obtains the seventh scan shot 107 through the scan process, the second cluster 202 including the sixth scan shot 106, that is, a previous scan shot, may function as an active cluster.

In this case, the scan shot 100, the active cluster, and the inactive cluster may be displayed on a user interface screen 500 having a plurality of areas. For example, an obtained scan shot 100 and an active cluster may be primarily displayed on the screen 500 of the user interface, and an inactive cluster may be incidentally displayed on the screen 500 of the user interface. More specifically, the screen 500 of the user interface may include a main area 510 occupying a given area, and a sub-area 520 occupying an area smaller than the main area 510. In this case, the main area 510 may be formed to include the center of the screen 500 of the user interface in a way to be visually easily displayed to a user, and the sub-area 520 may be formed on one side of the screen 500 of the user interface. In order for a user to display, on the screen 500 of the user interface, a scan process along with a currently obtained scan shot 100 in real time, the obtained scan shot 100 and the second cluster 202, that is, an active cluster, may be displayed in the main area 510. The first cluster 201, that is, an inactive cluster, may be displayed in the sub-area 520. The user may obtain scan information, such as the number of clusters 200 generated and a location of an object O now being scanned, through the main area 510 and the sub-area 520.

Referring to FIGS. 12 to 14 together, the seventh scan shot 107 may be obtained and subjected with scan shot alignment with the sixth scan shot 106, that is, a previous scan shot, and may be subjected with cluster alignment with the first cluster 201, that is, an inactive cluster. In this case, if the scan shot alignment fails and the cluster alignment is successful, the seventh scan shot 107 may be included in the first cluster 201, that is, an inactive cluster. Furthermore, the first cluster 201 may be changed into an active cluster (the activation of the inactive cluster), and the second cluster 202 may be changed into an inactive cluster (the deactivation of the active cluster). Referring to FIG. 14, the first cluster 201 that includes a scan shot (more specifically, the seventh scan shot) and that was an inactive cluster may be activated and displayed in the main area 510 of the screen 500 of the user interface. At the same time, the second cluster 202 that does not include a scan shot and that was an active cluster may be deactivated, and a schematic shape thereof may be displayed in a thumbnail form in the sub-area 520 of the screen 500 of the user interface. There are advantages in that a user can easily check a location of an object O now being scanned and user's convenience is improved because displayed areas are changed as an active cluster and an inactive cluster are changed as described above.

In the aforementioned contents, the scan shot alignment and the cluster alignment may be limitedly performed on a specific area. For example, when scan shot alignment and cluster alignment are performed, an area with which alignment is performed may be limited to only an area representing teeth among a scan shot and a cluster representing an object, and a gum, a tongue, a soft tissue, noise, etc. may be excluded from the object of the alignment. A process of distinguishing between the area representing the teeth and the remaining area may be performed by using artificial intelligence (AI) by image learning. A process of excluding noise, etc. may be performed by using a known noise filtering technology. The data processing method according to the present disclosure has an advantage in that scan shot alignment and/or cluster alignment can be rapidly and accurately performed because only teeth is limited as the subject of alignment. Furthermore, there is an advantage in that the time taken to finally obtain a 3-D model having a high level of completion can be reduced because a merging speed between clusters can be increased.

Hereinafter, a data processing apparatus according to the present disclosure using the data processing method is described. In describing the data processing apparatus, contents redundant with the aforementioned contents are described in brief or omitted.

Figure 15:
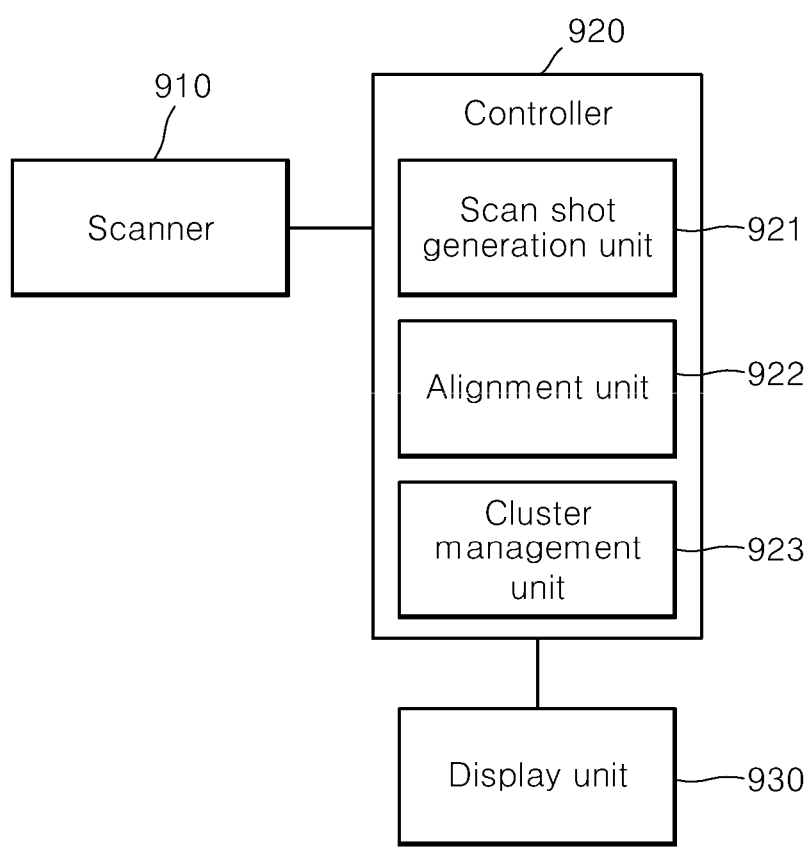
FIG. 15 is a configuration of a data processing apparatus according to the present disclosure.

FIG. 15 is a configuration of a data processing apparatus 900 according to the present disclosure.

Referring to FIG. 15, the data processing apparatus 900 according to the present disclosure includes a scanner 910, a controller 920, and a display unit 930. The scanner 910 may scan an object. The scanner 910 may have embedded therein at least one camera (not illustrated) for receiving light. Light reflected by a surface of an object may be incident on the inside of the scanner 910 and received by the lens of the camera. A scan shot representing the object may be generated based on the light received by the camera. The scanner 910 may be a table scanner capable of rotating or moving an object mounted on a tray thereof, and may be a portable scanner that is held by a user and that performs a scan process toward an object.

The controller 920 is electrically connected to the scanner 910, and may generate a scan shot based on light received by the scanner 910. Furthermore, the controller 920 may align the scan shot with a pre-formed cluster (more specifically, an inactive cluster), and may selectively merge an active cluster and an inactive cluster based on the alignment.

A detailed configuration of the controller 920 is more specifically described. The controller 920 includes a scan shot generation unit 921 which generates a scan shot based on an object scanned by the scanner 910. The scan shot generation unit 921 may receive light received by the camera of the scanner 910 and generate a scan shot. The scan shot may be 2-D image data or a 3-D data piece. The scan shot generation unit 921 has been illustrated as being one component of the controller 920, but the present disclosure is not essentially limited thereto. The scan shot generation unit 921 may be formed as one component of the scanner 910, if necessary.

Furthermore, the controller 920 includes an alignment unit 922. The alignment unit 922 may align a scan shot, generated by the scan shot generation unit 921, with a previous scan shot included in an active cluster (scan shot alignment), or may align the scan shot with an inactive cluster (cluster alignment). For example, a process of aligning a scan shot, generated and obtained by the scan shot generation unit 921, with a previous scan shot included in an active cluster may be performed by using the ICP alignment method. A process of aligning a scan shot with an inactive cluster may be performed by using an initial alignment method. The scan shot alignment and the cluster alignment may be performed by comparing scan shot feature points of the scan shot and cluster feature points of the cluster. A process of performing alignment by using the feature points has been described above.

Furthermore, the alignment unit 922 may simultaneously or sequentially perform a process of aligning a scan shot with a previous scan shot and a process of aligning a scan shot with an inactive cluster. That is, the alignment unit 922 may perform step S121 and step S122. In this case, the order of execution of step S121 and step S122 may be simultaneous or sequential. Step S121 may be first performed and step S122 may be then performed, or step S122 may be first performed and step S121 may be then performed.

Furthermore, the controller 920 includes a cluster management unit 923. The cluster management unit 923 plays a role to generate and manage a cluster. For example, the cluster management unit 923 may merge a plurality of clusters based on a result of the alignment of the alignment unit 922. Furthermore, the cluster management unit 923 may generate a new active cluster based on a result of the alignment of the alignment unit 922, and may manage a scan shot so that the scan shot is included in the new active cluster. Furthermore, the cluster management unit 923 may manage clusters so that an inactive cluster is activated or an active cluster is deactivated.

Hereinafter, a detailed operation of the cluster management unit 923 is described.

If the alignment unit 922 aligns a scan shot with a previous scan shot and aligns the scan shot with an inactive cluster, the cluster management unit 923 may merge an active cluster including the previous scan shot and the inactive cluster. In this case, the cluster management unit 923 may perform the merging between the clusters in a way that the inactive cluster is merged with the active cluster. The merged cluster includes scan shots included in the active cluster and scan shots included in the inactive cluster. There are advantages in that the number of clusters constituting a 3-D model can be reduced in a scan process and a complete 3-D model can be more rapidly obtained because scan shots are subjected to scan shot alignment and cluster alignment.

Furthermore, if the alignment unit 922 aligns a scan shot with a previous scan shot and does not align the scan shot with an inactive cluster, the cluster management unit 923 may include the scan shot in an active cluster including the previous scan shot. In a subsequent scan process, the active cluster including the scan shot maintains a state in which the active cluster continues to be activated.

Furthermore, if the alignment unit 922 does not align a scan shot with a previous scan shot and does not align the scan shot with an inactive cluster, the cluster management unit 923 may perform control so that a new group including the scan shot is generated. More specifically, the cluster management unit 923 deactivates an active cluster, generates a new active cluster, and includes the scan shot in the new active cluster. Accordingly, in a subsequent scan process, the new active cluster may function as an active cluster.

Furthermore, if the alignment unit 922 does not align a scan shot with a previous scan shot and aligns the scan shot with an inactive cluster, the cluster management unit 923 performs control so that the scan shot is included in the inactive cluster. In this case, while including an obtained scan shot in the inactive cluster, the cluster management unit 923 may activate the inactive cluster including the scan shot (changes the inactive cluster into an active cluster), and may deactivate an active cluster including the previous scan shot (changes the active cluster into an inactive cluster). The inactive cluster becomes the subject of cluster alignment with a scan shot that is subsequently newly obtained, the active cluster becomes the subject of scan shot alignment, and a detailed description related thereto has been described above. According to the aforementioned process, although scan shot alignment fails, if cluster alignment is successful, the cluster management unit 923 can activate and use an inactive cluster without generating an unnecessary new cluster. Accordingly, there is an advantage in that an operation speed is increased because the number of clusters taken into consideration in an alignment process is minimized.

The display unit 930 may visually display, to a user, at least some of scan shots and clusters in the aforementioned contents. More specifically, the display unit 930 may display at least one of a scan shot, an inactive cluster, and an active cluster. The user may comprehensively easily check a location of an object that is now scanned, the number of clusters generated, etc. by checking the display unit 930. A known visual display device may be used as the display unit 930. For example, the display unit 930 may be a monitor, a tablet, a touch screen, etc.

The display unit 930 includes a main area occupying a given area and a sub-area occupying an area smaller than the main area, and displays a user interface having a plurality of areas. The display unit 930 may display an active cluster and a scan shot in the main area of the user interface, and may display an inactive cluster in the sub-area of the user interface.

Furthermore, if a scan shot is included in an inactive cluster, the display unit 930 may activate the inactive cluster and display the active cluster in the main area, and may deactivate an active cluster and display the inactive cluster in the sub-area in a thumbnail form, under the control of the cluster management unit 923. Accordingly, there is an advantage in that a user can easily check a location of an object now being scanned because clusters are changed.

The above description is merely a description of the technical spirit of the present disclosure, and those skilled in the art may change and modify the present disclosure in various ways without departing from the essential characteristic of the present disclosure.

Accordingly, the embodiments described in the present disclosure should not be construed as limiting the technical spirit of the present disclosure, but should be construed as describing the technical spirit of the present disclosure. The technical spirit of the present disclosure is not restricted by the embodiments. The range of protection of the present disclosure should be construed based on the following claims, and all of technical spirits within an equivalent range of the present disclosure should be construed as being included in the scope of a right of the present disclosure.

DESCRIPTION OF REFERENCE NUMERALS

S110: step of obtaining scan shot
S120: step of aligning
S130: step of selectively merging
100: scan shot 200: cluster
500: user interface screen 510: main area
520: sub-area
900: data processing apparatus

What is claimed is:

1. A data processing method comprising:
obtaining a scan shot representing an object by a scanner;
aligning the scan shot with a pre-formed at least one inactive cluster through cluster alignment aligning the scan shot with the pre-formed at least one inactive cluster by a controller; and
selectively merging an active cluster comprising the scan shot which is aligned through scan shot alignment aligning the scan shot with a previous scan shot and the inactive cluster that the scan shot is aligned through the cluster alignment based on whether the scan shot is aligned with the inactive cluster by the controller.

2. The data processing method of claim 1, further comprising aligning the scan shot with a previous scan shot included in the active cluster by the controller,
wherein the aligning of the scan shot with the inactive cluster and the aligning of the scan shot with the previous scan shot are simultaneously or sequentially performed.

3. The data processing method of claim 2, wherein the selectively merging of the active cluster and the inactive cluster comprises merging the inactive cluster with the active cluster and including, in the active cluster, scan shots included in the inactive cluster, when the scan shot is aligned with the previous scan shot and the scan shot is aligned with the inactive cluster.

4. The data processing method of claim 2, wherein when the scan shot is aligned with the previous scan shot and the scan shot is not aligned with the inactive cluster, the scan shot is included in the active cluster.

5. The data processing method of claim 2, wherein when the scan shot is not aligned with the previous scan shot and the scan shot is not aligned with the inactive cluster, the active cluster is deactivated, a new active cluster is generated, and the scan shot is included in the new active cluster.

6. The data processing method of claim 2, wherein when the scan shot is not aligned with the previous scan shot and the scan shot is aligned with the inactive cluster, the scan shot is included in the inactive cluster.

7. The data processing method of claim 6, wherein when the scan shot is included in the inactive cluster, the inactive cluster is activated, and the active cluster not including the scan shot is deactivated.

8. The data processing method of claim 6, wherein:
the scan shot, the active cluster, and the inactive cluster are displayed on a screen of a user interface having a plurality of areas comprising a main area occupying a given area and a sub-area occupying an area smaller than the main area,
the scan shot and the active cluster are displayed in the main area, and
when the scan shot is included in the inactive cluster, the inactive cluster is activated and displayed in the main area, and the active cluster not including the scan shot is deactivated and displayed in the sub-area.

9. The data processing method of claim 1, wherein the aligning of the scan shot with the inactive cluster comprises aligning feature points of the scan shot and feature points of the inactive cluster.

10. A data processing apparatus comprising:
a scanner scanning an object;
a controller configured to align a scan shot obtained by scanning the object with a pre-formed at least one inactive cluster through cluster alignment aligning the scan shot with the pre-formed at least one inactive cluster and selectively merge an active cluster comprising the scan shot which is aligned through scan shot alignment aligning the scan shot with a previous scan shot and the inactive cluster that the scan shot is aligned through the cluster alignment based on whether the scan shot is aligned with the inactive cluster; and
a display unit displaying at least one of the scan shot, the inactive cluster, and the active cluster.

11. The data processing apparatus of claim 10, wherein the controller comprises:
a scan shot generation unit configured to generate the scan shot based on the object scanned by the scanner;
an alignment unit configured to align the scan shot with a previous scan shot included in the active cluster or align the scan shot with the inactive cluster; and
a cluster management unit configured to generate and manage the inactive cluster and the active cluster based on a result of the alignment of the alignment unit.

12. The data processing apparatus of claim 11, wherein the alignment unit simultaneously or sequentially performs a process of aligning the scan shot with the previous scan shot and a process of aligning the scan shot with the inactive cluster.

13. The data processing apparatus of claim 11, wherein when the scan shot is aligned with the previous scan shot and the scan shot is aligned with the inactive cluster, the cluster management unit merges the inactive cluster with the active cluster and includes, in the active cluster, scan shots included in the inactive cluster.

14. The data processing apparatus of claim 11, wherein when the scan shot is aligned with the previous scan shot and the scan shot is not aligned with the inactive cluster, the cluster management unit includes the scan shot in the active cluster.

15. The data processing apparatus of claim 11, wherein when the scan shot is not aligned with the previous scan shot and the scan shot is not aligned with the inactive cluster, the cluster management unit deactivates the active cluster, generates a new active cluster, and includes the scan shot in the new active cluster.

16. The data processing apparatus of claim 11, wherein when the scan shot is not aligned with the previous scan shot and the scan shot is aligned with the inactive cluster, the cluster management unit includes the scan shot in the inactive cluster.

17. The data processing apparatus of claim 16, wherein the cluster management unit
changes, into the inactive cluster, an active cluster with which the scan shot has not been aligned, and
changes, into the active cluster, an inactive cluster with which the scan shot has been aligned.

18. The data processing apparatus of claim 16, wherein the display unit
displays a user interface having a plurality of areas comprising a main area occupying a given area and a sub-area occupying an area smaller than the main area,
displays the scan shot and the active cluster in the main area, and
activates and displays the inactive cluster in the main area and deactivates and displays the active cluster in the sub-area when the scan shot is included in the inactive cluster.

* * * * *